United States Patent
Lin et al.

(10) Patent No.: US 12,425,606 B2
(45) Date of Patent: Sep. 23, 2025

(54) METHOD OF SPARSE EDGE ENCODING FOR IMAGE

(71) Applicant: National Tsing Hua University, Hsinchu (TW)

(72) Inventors: Hsiu-Hau Lin, Hsinchu (TW); Mei Ian Sam, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 300 days.

(21) Appl. No.: 18/447,087

(22) Filed: Aug. 9, 2023

(65) Prior Publication Data
US 2024/0305787 A1    Sep. 12, 2024

(30) Foreign Application Priority Data
Mar. 8, 2023    (TW) ................................. 112108532

(51) Int. Cl.
H04N 19/14       (2014.01)
H04N 19/182     (2014.01)

(52) U.S. Cl.
CPC ........... H04N 19/14 (2014.11); H04N 19/182 (2014.11)

(58) Field of Classification Search
CPC ............................. H04N 19/14; H04N 19/182
See application file for complete search history.

(56) References Cited

U.S. PATENT DOCUMENTS

| | | | | |
|---|---|---|---|---|
| 2008/0205783 | A1* | 8/2008 | Sandrew .................. | G06T 7/37 382/254 |
| 2010/0014596 | A1* | 1/2010 | Bruton ................. | H04N 19/117 382/268 |
| 2010/0128803 | A1 | 5/2010 | Divorra Escoda et al. | |
| 2020/0342632 | A1* | 10/2020 | Frumkin ................. | G06F 7/544 |
| 2024/0037924 | A1* | 2/2024 | Linde ..................... | G06V 10/82 |

FOREIGN PATENT DOCUMENTS

| | | | | |
|---|---|---|---|---|
| CN | 101911704 | A | 12/2010 | |
| DE | 102019133028 | A1 * | 10/2020 | ............. G06N 3/045 |
| KR | 20230072491 | A * | 5/2023 | ........... H04N 19/172 |
| TW | 418382 | B | 1/2001 | |
| TW | 201016012 | A1 | 4/2010 | |
| WO | WO-0109821 | A1 * | 2/2001 | ............. G06V 10/88 |

OTHER PUBLICATIONS

Taiwanese Search Report dated Nov. 14, 2023 for Application No. 112108532 with an English translation.

* cited by examiner

*Primary Examiner* — Vu Le
*Assistant Examiner* — Jacob Tyler Collogan
(74) *Attorney, Agent, or Firm* — Birch, Stewart, Kolasch & Birch, LLP

(57) ABSTRACT

A method of sparse edge encoding for an image is to be implemented by a computer. The computer stores an original image, and the original image has a plurality of pixels. The method includes a step of cross-correlating the pixels of the original image with a mask matrix to obtain a plurality of Laplacian charges (L-charges) respectively corresponding to the pixels. Those of the L-charges that correspond to those of the pixels which represent an edge of an object in the original image have greater absolute values than other L-charges of the L-charges. The mask matrix is a square matrix, and a sum of all elements of the mask matrix is zero.

4 Claims, 5 Drawing Sheets
(1 of 5 Drawing Sheet(s) Filed in Color)

cross-correlating pixels of original image with mask matrix to obtain image charges —21

FIG. 2 obtaining decoded pixel datasets to obtain reconstructed image —31

FIG. 3

METHOD OF SPARSE EDGE ENCODING FOR IMAGE

CROSS-REFERENCE TO RELATED APPLICATION

This application claims priority to Taiwanese Invention Patent Application No. 112108532, filed on Mar. 8, 2023.

FIELD

The disclosure relates to a method of processing an image, and more particularly to a method of sparse edge encoding and decoding for an image.

BACKGROUND

Natural images and medical images typically contain a significant amount of pixel information. For example, an image may have a size of 512×512 pixels, where each of the pixels may be represented by 256 levels of grayscale, resulting in a 262144-dimensional vector of the pixel information. As a result, rendering analysis, classification, diagnosis, storage and transmission of the image would require extensive computation.

Conventional methods of encoding and decoding images include principal component analysis (PCA), independent component analysis (ICA), non-negative matrix factorization (NMF), etc. However, the conventional methods have different drawbacks for processing natural images and medical images. PCA is able to prioritize processing of important pixels of an image, which may reduce image distortion, but is unable to increase sparsity of the image, and thus requires extensive computation to encode and decode the image. ICA and NMF are able to increase the sparsity of the image processed thereby, which may reduce computation, but are unable to prioritize processing of the important pixels, and thus increase image distortion.

SUMMARY

Therefore, an object of the disclosure is to provide a method of sparse edge encoding for an image that can alleviate at least one of the drawbacks of the prior art.

According to the disclosure, a method of sparse edge encoding for an image is to be implemented by a computer. The computer stores an original image, and the original image has a plurality of pixels. The method includes a step of cross-correlating the pixels of the original image with a mask matrix to obtain a plurality of Laplacian charges (L-charges) respectively corresponding to the pixels. Those of the L-charges that correspond to those of the pixels which represent an edge of an object in the original image have greater absolute values than other L-charges of the L-charges. The mask matrix is a square matrix, and a sum of all elements of the mask matrix is zero.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Other features and advantages of the disclosure will become apparent in the following detailed description of the embodiment(s) with reference to the accompanying drawings. It is noted that various features may not be drawn to scale.

FIG. 2 is a flow chart illustrating an encoding step of a method of sparse edge encoding and decoding for an image according to an embodiment of the disclosure.

FIG. 3 is a flow chart illustrating a decoding step of a method of sparse edge encoding and decoding for an image according to an embodiment of the disclosure.

DETAILED DESCRIPTION

Figure 1:
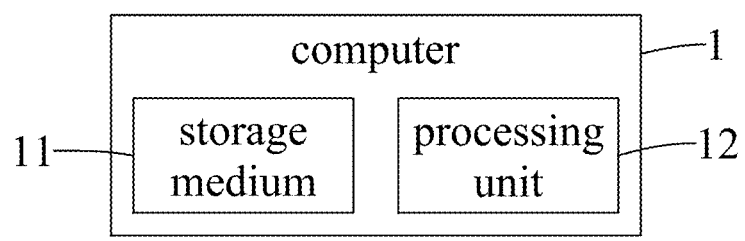
FIG. 1 is a block diagram illustrating a computer according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a computer 1 for implementing a method of sparse edge encoding and decoding for an image is illustrated. The computer 1 includes a storage medium 11 and a processing unit 12 that is electrically connected to the storage medium 11. The computer 1 may be, but is not limited to, a personal computer, a desktop computer, a laptop computer, a tablet, a server, or a cloud host. The storage medium 11 may be embodied using computer-readable storage medium such as hard disk drive(s), random access memory (RAM), read only memory (ROM), programmable ROM (PROM), firmware, flash memory, etc. The processing unit 12 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The storage medium 11 stores an original image that has a plurality of pixels, where each of the pixels includes a pixel value and a pixel coordinate set. In this embodiment, the original image may be, but is not limited to, a natural image or a medical image.

The method of sparse edge encoding and decoding for an image according to an embodiment of the disclosure includes a step of sparse edge encoding (step 21 in FIG. 2) and a step of sparse edge decoding (step 31 in FIG. 3).

In step 21, the processing unit 12 cross-correlates the pixels of the original image with a mask matrix to obtain a plurality of Laplacian charges (L-charges) respectively corresponding to the pixels.

The L-charges are represented by a first equation as follows.

$$g(x, y) = \Sigma_{x',y'} W(x', y') f(x+x', y+y') \qquad \text{(eq. 1)}$$

In the first equation (eq.1), $g(x,y)$ represents one of the L-charges corresponding to one of the pixels that has the pixel coordinate set of (x,y), W(x',y') represents the mask matrix, and f(x,y) represents the pixel value of said one of the pixels.

The first equation (eq.1) may be expressed in a form of a Poisson equation as a second equation shown below.

$$\nabla^2 f = g \qquad \text{(eq. 2)}$$

In the second equation (eq.2), f represents the pixel values corresponding respectively to the pixels of the original image, $\nabla^2$ represents the mask matrix, and g represents the L-charges.

For example, the mask matrix is expressed as:

$$W(x', y') = \begin{bmatrix} -1 & -1 & -1 \\ -1 & 8 & -1 \\ -1 & -1 & -1 \end{bmatrix}$$

It should be noted that the mask matrix is a square matrix and a sum of all elements of the mask matrix is zero. It should be further noted that the mask matrix is an infinite matrix; however, in this embodiment, all elements other than the nine non-zero elements (as listed in the above example) are zero, and therefore, the mask matrix is represented as a 3×3 matrix.

In step 31, the processing unit 12 finds a steady-state solution for each of the pixels of the original image to obtain a decoded pixel dataset corresponding to the pixel. The processing unit 12 then obtains a reconstructed image according to the decoded pixel datasets corresponding respectively to the pixels of the original image.

In further detail, in this embodiment, the steady-state solutions corresponding respectively to the pixels of the original image are obtained according to the L-charges and the mask matrix using an algorithm that is for solving, for example, sparse linear systems, and each of the decoded pixel datasets includes a decoded pixel value and a decoded pixel coordinate set. It should be noted that a sparse linear system is a system of linear equations where only a small number of its matrix elements are nonzero. In other embodiments, a different decoding algorithm may be used to obtain the steady-state solutions corresponding respectively to the pixels of the original image, and the disclosure is not limited to the algorithm for solving sparse linear systems.

In this embodiment, the algorithm is a relaxation method, and the steady-state solutions are solutions of the Poisson equation (eq.2) and are obtained using a third equation as follows.

$$\frac{\partial f}{\partial t} = D(\nabla^2 F - g) \qquad \text{(eq. 3)}$$

In the third equation (eq.3), F represents the decoded pixel values respectively of the decoded pixel datasets, $$\frac{\partial f}{\partial t}$$

represents a change of the decoded pixel values of the decoded pixel datasets over time, D represents a coefficient of the algorithm, $\nabla^2$ represents the mask matrix, and g represents the L-charges.

In step 31, a multigrid method may be involved in the relaxation method to accelerate computation for obtaining the reconstructed image. Since the multigrid method is not the emphasis of this disclosure, it will not be described in further detail for the sake of brevity.

In this embodiment, the mask matrix is, but not limited to, a discrete Laplacian operator (i.e., a Laplacian matrix) to enhance convergence of solutions of the Poisson equation (eq.2) to the steady-state solutions of the Poisson equation (eq.2) in step 31.

Figure 4:
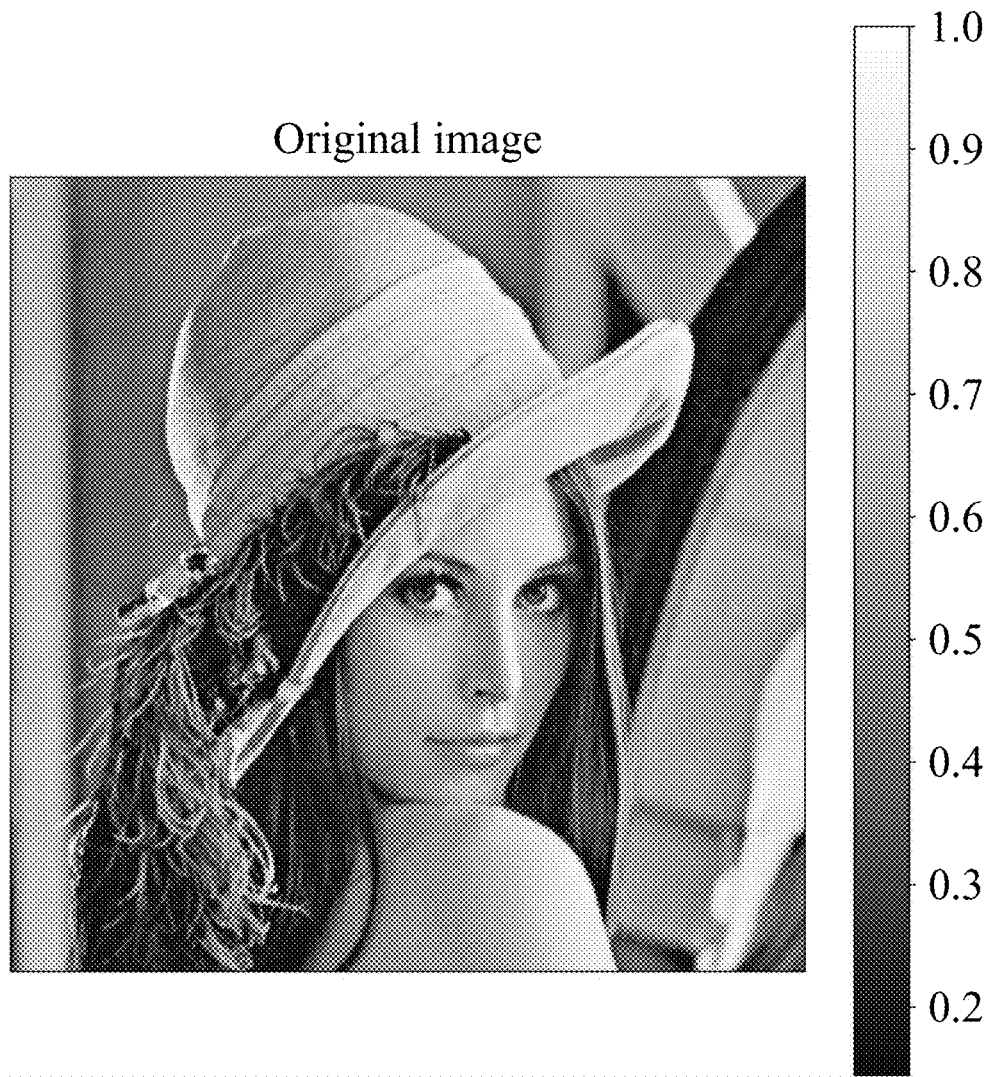
FIG. 4 is a schematic view illustrating an original image according to an embodiment of the disclosure.
Figure 5:
FIG. 5 is a schematic view illustrating a Laplacian charge plot that is obtained from the original image according to an embodiment of the disclosure.
Figure 6:
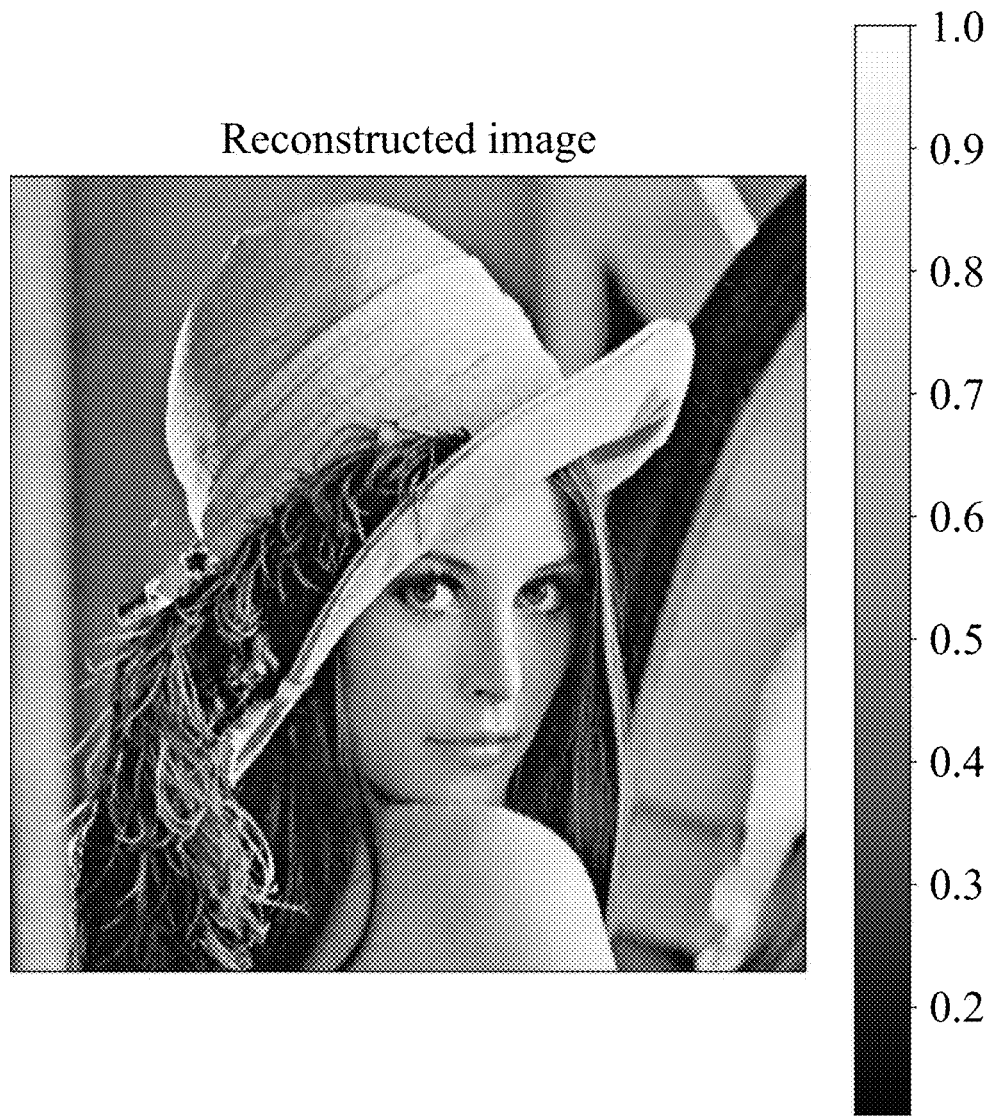
FIG. 6 is a schematic view illustrating a reconstructed image that is obtained from the original image according to an embodiment of the disclosure.

Reference is further made to FIGS. 4 to 6, in which FIG. 4 illustrates an example of an original image, FIG. 5 illustrates an L-charge plot obtained by encoding the original image in step 21, and FIG. 6 illustrates a reconstructed image obtained in step 31. The L-charges may be positive, negative, or zero, and positive, negative and zero L-charges are represented by colors red, blue, and white, respectively, with greater absolute values being represented by darker colors.

As shown in FIG. 5, those of the L-charges that correspond to those of the pixels which represent an edge of an object in the original image have greater absolute values than other L-charges of the L-charges, and form dipoles around the edge of the object in the L-charge plot. It should be understood that those of the pixels that represent smooth surfaces (i.e., not the edge of the object) are formed by diffusive reflection of photons (where photons are evenly and randomly scattered) and thus the value obtained by applying the Laplacian operator on each pixel that represents part of a smooth surface is substantially zero; on the other hand, those of the pixels that represent the edge of the object would experience singularity of diffusive scattering (i.e., non-random scattering of photons at complex surface/medium causing large fluctuation in intensity of scattered photons) and thus the value obtained by applying the Laplacian operator on each pixel that represents part of the edge of the object will have a greater absolute value due to photons not being scattered randomly. The Laplacian operator is chosen as the mask for this very reason.

It should be noted that natural images are formed by diffusive reflection of photons (i.e., incoherent angular scattering of photons from a surface), and medical images are formed by diffusive transmission (i.e., scattering of photons as they pass through a medium, such as a tissue in a human body). Though diffusive reflection and diffusive transmission are of different physical origins, both diffusive reflection and diffusive transmission include diffusive scattering, which leads to universal angular dependence of the scattered photons, and thus the Laplacian operator is suitable for both natural images and medical images.

It should be noted that the processing unit 12 may reconstruct different image textures by selecting some regions of the L-charge plot with different L-charge distributions. For example, as shown in the L-charge plot, wall, face, hat and feathers of the original image are clearly represented by different L-charge distributions.

Table 1 below shows Hoyer sparseness respectively of the original image and the L-charge plot. The Hoyer sparseness of the pixels in the original image is 6.93% while the Hoyer sparseness of the L-charge plot (namely, the L-charges obtained from step 21) is 37.45%, which demonstrates an enhancement of 541% (i.e., the Hoyer sparseness of the pixels in the L-charge plot is 5.41 times greater than the Hoyer sparseness of the original image). Since the Hoyer sparseness has increased by way of step 21, the reconstructed image may be obtained with less computation. That is to say, only those of the L-charges having relatively greater absolute values remain to be decoded in step 31 (i.e., L-charges having absolute values substantially equal to or close to zero are skipped, thus increasing sparseness), which also means that the pixels corresponding to the L-charges having relatively greater absolute values are prioritized over the pixels corresponding to the L-charges having absolute values substantially equal to or close to zero (i.e., prioritized processing of pixels that are more important). For example, the pixels corresponding to the L-charges having absolute values greater than a predetermined value are prioritized over the pixels corresponding to the L-charges having absolute values substantially equal to or close to zero, and the predetermined value may be determined according to different demands and actual applications of the method.

TABLE 1

| Hoyer sparseness | Original image | 6.93% |
|---|---|---|
| | L-charge plot | 37.45% |
| | Enhancement | 541% |

It should be noted that the method according to the disclosure may also be applicable to a video, where the video contains a series of consecutive original images.

In summary, the processing unit 12 obtains the L-charges of the pixels of the original image with sparse edge encoding, and only the pixels corresponding to the L-charges of non-zero values remain on the L-charge plot, thus increasing the sparseness. The processing unit 12 further obtains the reconstructed image with sparse edge decoding, and since the L-charges correspond to the pixels that are located around the edge(s) of object(s) in the original image, the pixels that carry more information (i.e., the pixels with L-charges of non-zero values) are prioritized when decoding, thus increasing the precision of the reconstructed image. Therefore, the method according to the disclosure can both increase the sparseness of the image and prioritize processing of the pixels with more information, which may increase computation speed and precision for image analysis, classification, storage, and transmission.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of sparse edge encoding for an image, the method to be implemented by a computer storing an original image, the original image having a plurality of pixels, the method comprising a step of:

cross-correlating the pixels of the original image with a mask matrix to obtain a plurality of Laplacian charges (L-charges) respectively corresponding to the pixels, wherein those of the L-charges that correspond to those of the pixels which represent an edge of an object in the original image have greater absolute values than other L-charges of the L-charges, and wherein the mask matrix is a square matrix, and a sum of all elements of the mask matrix is zero.

2. The method as claimed in claim 1, wherein the L-charges are represented by an equation of:

$$g(x, y) = \Sigma_{x',y'} W(x', y') f(x + x', y + y')$$

where g(x,y) represents one of the L-charges that corresponds to one of the pixels which has a pixel coordinate set of (x,y), W(x',y') represents the mask matrix, and f(x,y) represents a pixel value of said one of the pixels.

3. The method as claimed in claim 1, further comprising steps of:

for each of the pixels of the original image, finding a steady-state solution to obtain a decoded pixel dataset corresponding to the pixel; and obtaining a reconstructed image according to the decoded pixel datasets corresponding respectively to the pixels of the original image, wherein the steady-state solutions corresponding respectively to the pixels of the original image are obtained according to the L-charges and the mask matrix using an algorithm that is for solving sparse linear systems, and each of the decoded pixel datasets includes a decoded pixel value and a decoded pixel coordinate set.

4. The method as claimed in claim 3, wherein the algorithm is a relaxation method, and the steady-state solutions are solutions of a Poisson equation and are obtained using an equation of:

$$\frac{\partial f}{\partial t} = D(\nabla^2 F - g)$$

where F represents the decoded pixel values respectively of the decoded pixel datasets, $$\frac{\partial f}{\partial t}$$

represents a change of the decoded pixel values of the decoded pixel datasets over time, D represents a coefficient of the algorithm, $\nabla^2$ represents the mask matrix, and g represents the L-charges.

\* \* \* \* \*